United States Patent
Scutaru et al.

(10) Patent No.: US 10,297,027 B2
(45) Date of Patent: May 21, 2019

(54) LANDMARK DETECTION WITH SPATIAL AND TEMPORAL CONSTRAINTS IN MEDICAL IMAGING

(71) Applicant: Siemens Healthcare GmbH, Erlangen (DE)

(72) Inventors: Mihai Scutaru, Brasov (RO); Ingmar Voigt, Erlangen (DE); Tommaso Mansi, Plainsboro, NJ (US); Razvan Ionasec, Nuremberg (DE); Helene C. Houle, San Jose, CA (US); Anand Vinod Tatpati, Bangalore (IN); Dorin Comaniciu, Princeton, NJ (US); Bogdan Georgescu, Plainsboro, NJ (US); Noha Youssry El-Zehiry, Plainsboro, NJ (US)

(73) Assignee: Siemens Healthcare GmbH, Erlangen (DE)

( * ) Notice: Subject to any disclaimer, the term of this patent is extended or adjusted under 35 U.S.C. 154(b) by 3 days.

(21) Appl. No.: 15/317,353

(22) PCT Filed: Jun. 8, 2015

(86) PCT No.: PCT/US2015/034618
§ 371 (c)(1),
(2) Date: Dec. 8, 2016

(87) PCT Pub. No.: WO2015/191414
PCT Pub. Date: Dec. 17, 2015

(65) Prior Publication Data
US 2017/0116748 A1    Apr. 27, 2017

Related U.S. Application Data

(60) Provisional application No. 62/009,512, filed on Jun. 9, 2014, provisional application No. 62/128,177, filed on Mar. 4, 2015.

(51) Int. Cl.
*G06T 7/143* (2017.01)
*G06K 9/62* (2006.01)
(Continued)

(52) U.S. Cl.
CPC .......... *G06T 7/143* (2017.01); *G06K 9/6249* (2013.01); *G06K 9/6256* (2013.01);
(Continued)

(58) Field of Classification Search
CPC .............. G06T 7/0012; G06T 7/11; G06T 2207/20021; G06T 2207/30048;
(Continued)

(56) References Cited

U.S. PATENT DOCUMENTS 8,682,626 B2    3/2014    Ionasec et al. .......... 703/6
8,771,189 B2    7/2014    Ionasec et al. .......... 600/437
(Continued)

FOREIGN PATENT DOCUMENTS

| CN | 102999938 A | 3/2013 |
|---|---|---|
| CN | 103294883 A | 9/2013 |
| JP | 2009153600 A | 7/2009 |

OTHER PUBLICATIONS

Kelm, B. Michael, et al. "Spine detection in CT and MR using iterated marginal space learning." Medical image analysis 17.8; 2013; pp. 1283-1292.
(Continued)

*Primary Examiner* — Andrew W Johns

(57) ABSTRACT

Anatomy, such as papillary muscle, is automatically detected (34) and/or detected in real-time. For automatic detection (34) of small anatomy, machine-learnt classification with spatial (32) and temporal (e.g., Markov) (34) constraints is used. For real-time detection, sparse machine-learnt detection (34) interleaved with optical flow tracking (38) is used.

12 Claims, 7 Drawing Sheets

(51) Int. Cl.
*G06T 7/11* (2017.01)
*G06T 7/174* (2017.01)
*G06T 7/00* (2017.01)

(52) U.S. Cl.
CPC ......... *G06K 9/6267* (2013.01); *G06K 9/6297* (2013.01); *G06T 7/0012* (2013.01); *G06T 7/0016* (2013.01); *G06T 7/11* (2017.01); *G06T 7/174* (2017.01); *G06K 2209/051* (2013.01); *G06T 2207/10132* (2013.01); *G06T 2207/20076* (2013.01); *G06T 2207/20081* (2013.01); *G06T 2207/20132* (2013.01); *G06T 2207/20164* (2013.01); *G06T 2207/30048* (2013.01); *G06T 2210/12* (2013.01)

(58) Field of Classification Search
CPC ... G06T 2210/12; A61B 5/0044; A61B 6/503; A61B 8/0883
See application file for complete search history.

(56) References Cited

U.S. PATENT DOCUMENTS

| | | | |
|---|---|---|---|
| 8,934,693 B2 | 1/2015 | Grbic et al. | |
| 9,824,302 B2 | 11/2017 | Grbic et al. | |
| 2012/0087563 A1 | 4/2012 | Ionasec et al. | 382/131 |
| 2012/0232853 A1 | 9/2012 | Voigt et al. | 703/1 |
| 2012/0296202 A1 | 11/2012 | Mountney et al. | 600/424 |
| 2016/0174902 A1* | 6/2016 | Georgescu et al. | A61B 5/7267 600/408 |
| 2016/0262720 A1 | 9/2016 | Henderson et al. | A61B 8/14 |
| 2016/0287214 A1 | 10/2016 | Ralovich et al. | A61B 8/483 |

OTHER PUBLICATIONS

Razvan Ioan Ionasec et al: "Patient-Specific Modeling and Quantification of the Aortic and Mitral Valves From 4-0 Cardiac CT and TEE", IEEE Transactions on Medi Cal Imaging, IEEE Service Center, Piscataway, NJ, US, vol. 29, No. 9, Sep. 1, 2010 (Sep. 1, 2010), pp. 1636-1651, Sep. 1, 2010.
Mihai Scutaru et al: "Robust Detection of Mitral Papillary Muscle from 4D Transesophageal Echocardiography" In: "Lecture Notes in Computer Science", Jan. 1, 2015 (Jan. 1, 2015), Springer Berlin Heidelberg, Berlin, Heidelberg, Jan. 1, 2015.
Korean Office Action dated Jan. 22, 2018 in corresponding Korean application No. 2017-7000509.
Korean Notice of Allowance dated Jul. 10, 2018 in corresponding Korean Application No. 10-2017-7000509.
D. Forsyth, J. Ponce: Computer vision a modern approach (2nd edition); Prentice Hall; 2011; 302-305.
Y. Zheng, B. Georgescu, H. Lingm S.K. Zhou, M. Scheuering, D. Comaniciu: Constrained Marginal Space Learning for Efficient 3D Anatomical Structure Detection in Medical Images, IEEE Conf. Computer Vision and Pattern Recognition (CVPR'09), Miami, FL, 2009.
Voigt, T. Mansi, R. Ionasec, E.A. Mengue, H. Houle, B. Georgescu, J. Hornegger, D. Comaniciu: Robust Physically-Constrained Modeling of the Mitral Valve and Subvalvular Apparatus. Int'l Conf. Medical Image Computing and Computer Assisted Intervention, MICCAI (3) 2011: 504-511.
T. Mansi, I. Voigt, E.A. Mengue, R. Ionasec, B. Georgescu, T. Noack, J. Seeburger, Dorin Comaniciu: Towards Patient-Specific Finite-Element Simulation of MitralClip Procedure. Int'l Conf. Medical Image Computing and Computer Assisted Intervention, MICCAI (1) 2011: 452-459.
J. Kanik, T. Mansi, I. Voigt, P. Sharma, R. Ionasec, D. Comaniciu, J. Duncan: Estimation of Patient-Specific Material Properties of the Mitral Valve using 4D Transesophageal Echocardiography, ISBI, 2013.
Z. Tu: Probabilistic Boosting-Tree: Learning Discriminative Models for Classification, Recognition, and Clustering. ICCV 2005.
E. Votta, A. Arnoldi, A. Invernizzi, R. Ponzini, F. Veronesi, G. Tamborini, M. Pepi, F. Alamanni, A. Redaelli, E.G. Caiani: Mitral valve patient-specific finite element modeling from 3-D real time echocardiography: a potential new tool for surgical planning, MICCAI Workshop on Cardiovascular Interventional Imaging and Biophysical Modelling (2009).
AM. Pouch, C. Xu, PA. Yushkevich, AS. Jassar, M. Vergnat, JH. Gorman 3rd, RC. Gorman, CM. Sehgal, BM. Jackson: Semiautomated mitral valve morphometry and computational stress analysis using 3D ultrasound. Journal of Biomechanics, 2012.
R. Ionasec, I. Voigt, B. Georgescu, Y. Wang, H. Houle, F. Vega, N. Navab, D. Comaniciu: Patient-Specific Modeling and Quantification of the Aortic and Mitral valves from 4D Cardiac CT and TEE, IEEE Trans. Medical Imaging, 29(9): 1636-1651, 2010.
A. Carpentier, D.H. Adams, F. Filsoufi: Carpentier's Reconstructive Valve Surgery. From Valve Analysis to Valve Reconstruction. 2010 Saunders Elsevier.
A. Hast, J. Nysjo, A. Marcetti: Optimal RANSAC—Towards a Repeatable Algorithm for Finding the Optimal Set, Journal of WSCG, 2013.
S.Y. Ho: Anatomy of the mitral valve Heart. 2002 ; 88(Suppl IV):iv5-iv10.
R. Kothapa, J. Pacheco, E.B. Sudderth: Max-Product Particle Belief Propagation, Master Thesis, Brown, 2011.
Li et al. "A mitral annulus tracking approach for navigation of pump beating heart mitral valve repair". Medical Physics 42 (2015)—[only 2D TEE imaging, 4 points only].
Chinese Office Action dated Jan. 28, 2019 in corresponding Chinese application No. 201580030902.2.

\* cited by examiner

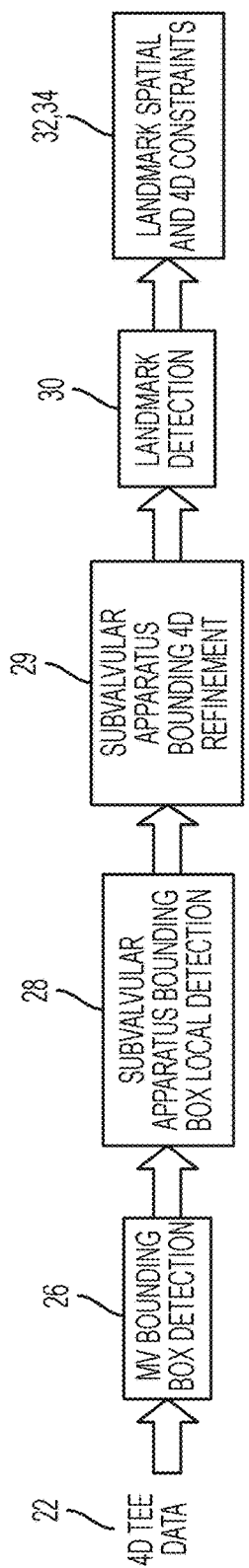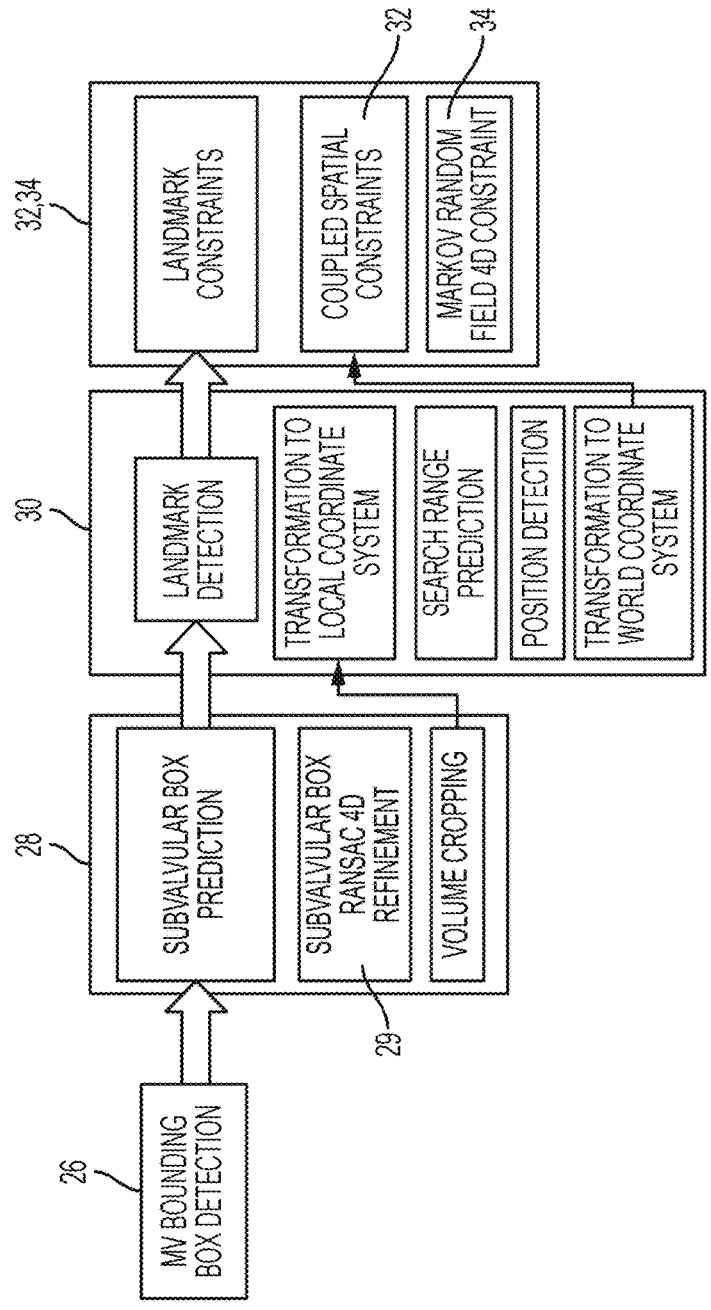

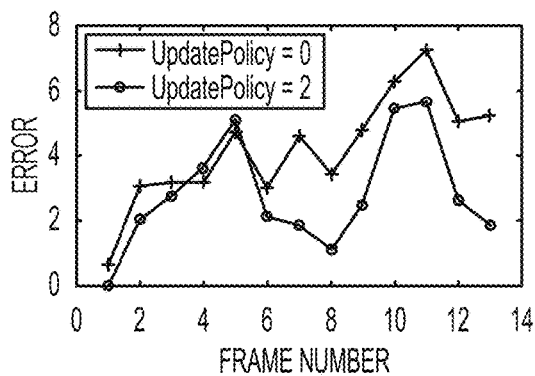
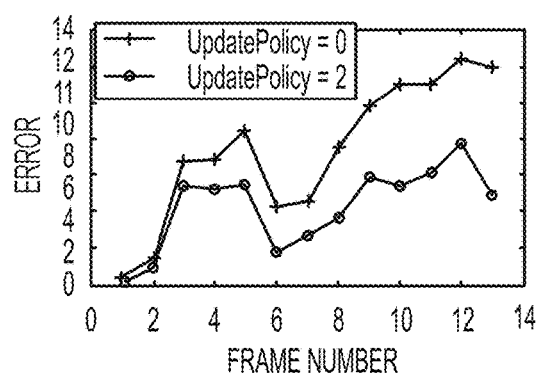
FIG. 11A  FIG. 11B
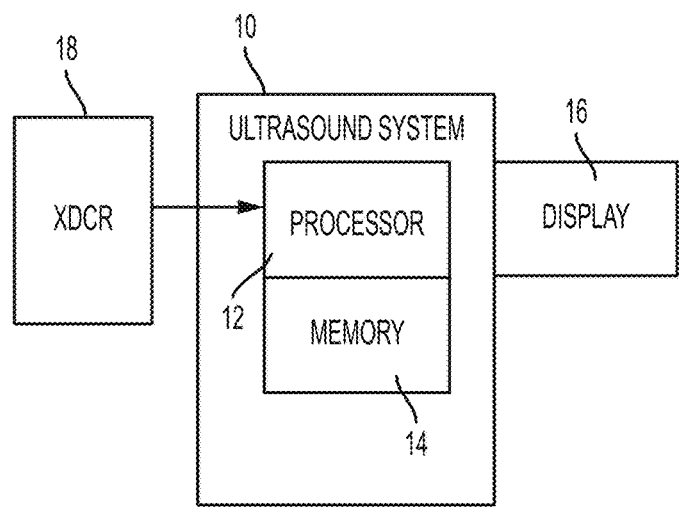
FIG. 12

LANDMARK DETECTION WITH SPATIAL AND TEMPORAL CONSTRAINTS IN MEDICAL IMAGING

RELATED APPLICATIONS

The present patent document claims the benefit of the filing dates under 35 U.S.C. § 119(e) of Provisional U.S. patent application Ser. Nos. 62/128,177, filed Mar. 4, 2015, and 62/009,512, filed Jun. 9, 2014, which are hereby incorporated by reference.

BACKGROUND

The present embodiments relate to landmark (e.g. point, contours, surfaces, or volumes) detection. In particular, anatomy is detected in medical imaging.

Transesophogeal echocardiography scans the heart of a patient. The mitral valve may be of particular interest. The mitral valve, which ensures the uni-directional flow from the left atrium to the left ventricle, may suffer from insufficient closure. Insufficient closure allows blood to leak into the atrium during systole. For treatment, a catheter mounted implant is delivered to the mitral valve. The planning and/or performance for any mitral valve treatment may benefit from the detection and tracking of the mitral valve structures in medical imaging.

Detection of the mitral valve structures may be difficult due to the small size and rapid movement. Rather than the time consuming manual identification of the mitral valve structures, automated approaches may be used. Marginal space learning may be used to detect both the aortic and the mitral valves, but without consistent results for papillary landmarks. Mechanical constraints may be added, giving more robust leaflet tracking and identification of sub-valvular apparatus.

Semi-automatic mechanisms generally combine initial user input to identify the landmark in the image. The landmark is then tracked across the neighboring frames. In one semi-automatic approach, users have 20 planes in which the papillary muscles are manually identified. This approach is time consuming.

Intra-operative imaging is used to guide the mitral repair procedure. The detection may not operate sufficiently rapidly for real-time guidance. Despite the availability of real-time capable four-dimensional (i.e., three-dimensional space with time) imaging hardware, limited two-dimensional imaging and analysis of a single cardiac phase at a time is typically used. The mitral valve annulus may be detected in real-time for two-dimensional imaging, but with limited spatial resolution, with costly magnetic tracking hardware, and being limited to track on images of the same cardiac phase.

BRIEF SUMMARY

By way of introduction, the preferred embodiments described below include methods, computer readable media and systems for detecting anatomy, such as papillary muscle, automatically and/or in real-time. For automatic detection of small anatomy, machine-learnt classification with spatial and temporal constraints is used. For real-time detection, sparse machine-learnt detection interleaved with optical flow tracking is used.

In a first aspect, a method is provided for detecting and/or tracking robustly point-wise landmarks like papillary muscle location in medical imaging. A sequence of frames of medical imaging data is acquired. Each of the frames represents a volume of a heart of a patient. A valve bounding box enclosing a valve of the heart is detected in each of the frames. In each of the frames, a sub-valvular bounding box enclosing the sub-valvular landmark (e.g., papillary muscle) location is detected based on the valve bounding box. Candidate locations of sub-valvular landmark location within the sub-valvular bounding box are detected in each of the frames. Candidate locations outside a spatial constraint are removed. One of the candidate locations remaining after the removing is selected in each of the frames as the sub-valvular landmark location. The selection is a function of the candidate locations across the frames. The sub-valvular landmark location is highlighted in an image of the heart of the patient.

In a second aspect, a non-transitory computer readable storage medium has stored therein data representing instructions executable by a programmed processor for landmark detection, where landmarks can be points, contours, surfaces or volumes. The storage medium includes instructions for locating candidate anatomical landmarks with a machine-learnt classifier, limiting the candidate anatomical landmarks with a spatial constraint, selecting a location of the landmark in each of a plurality of volumes from the candidate anatomical landmarks remaining after the limiting, the selection being a function of the candidate landmarks over time, and generating an image of the landmark.

In a third aspect, a system is provided for detecting an anatomical landmark, where landmark is a generic term that includes points, curves and meshes or surfaces. An ultrasound scanner is configured to scan a heart volume of a patient. The scan provides medical diagnostic ultrasound data representing at least a part of the heart over time. A processor is configured to determine a location of the anatomical landmark in real-time with the scan, the location determined with machine-learnt classification for sparse frames and optical flow for frames intervening between the sparse frames, the location being determined sequentially as the sparse frames and interleaved frames are acquired.

The present invention is defined by the following claims, and nothing in this section should be taken as a limitation on those claims. Further aspects and advantages of the invention are discussed below in conjunction with the preferred embodiments and may be later claimed independently or in combination.

BRIEF DESCRIPTION OF THE DRAWINGS

The components and the figures are not necessarily to scale, emphasis instead being placed upon illustrating the principles of the invention. Moreover, in the figures, like reference numerals designate corresponding parts throughout the different views.

FIGS. 1-3 are flow chart diagrams of different embodiments of a method for locating anatomy;

FIGS. 11A and 11B show example errors for optical flow tracking with and without occasional updating of location by machine-learnt detection; and FIG. 12 is a block diagram of one embodiment of a system for anatomical detection.

DETAILED DESCRIPTION OF THE DRAWINGS AND PRESENTLY PREFERRED EMBODIMENTS

Figure 1:
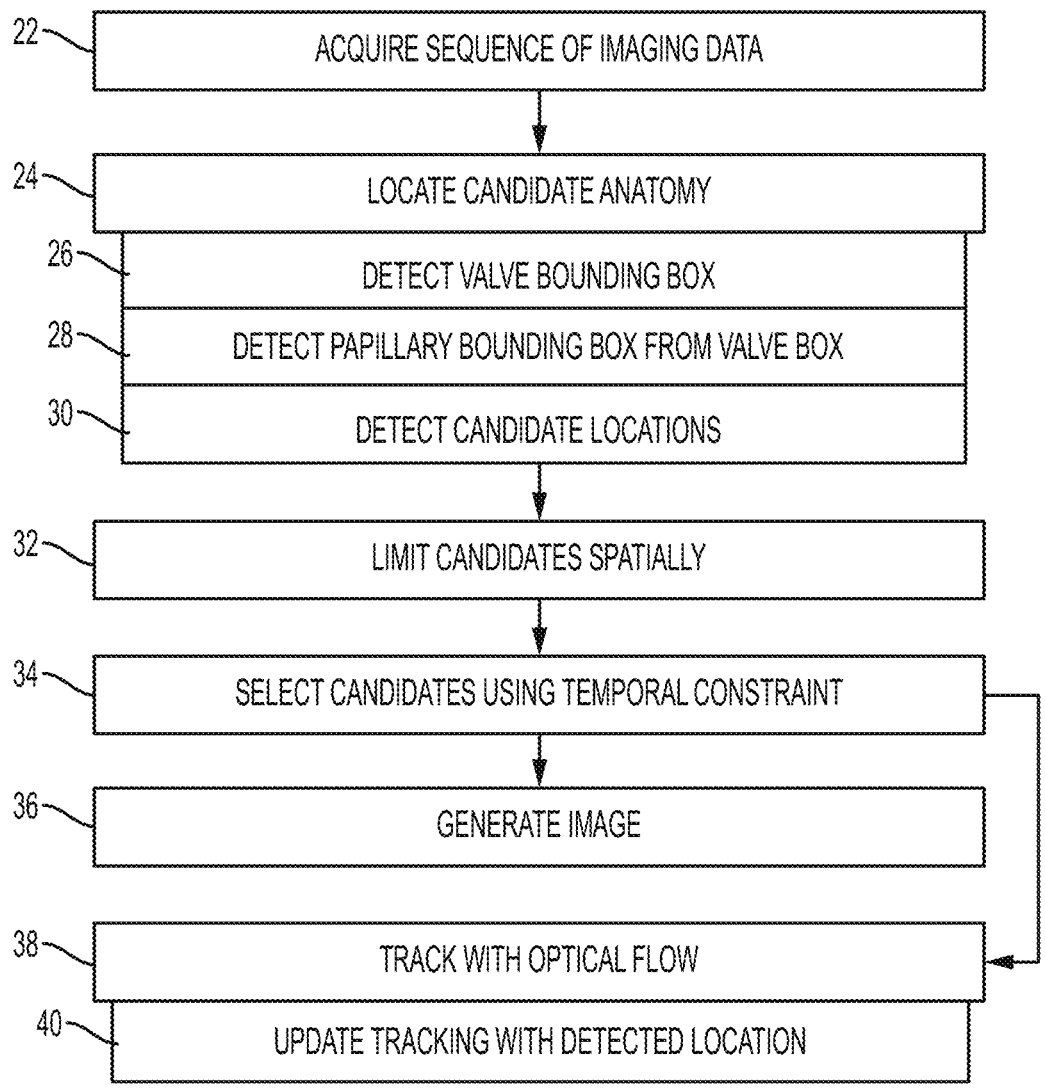

Approximately 65,000 valve repairs and replacements are performed in the United States each year. Mitral valve stenosis and prolapsed conditions are repaired. Twice as many women as men are affected by mitral valve stenosis. Mitral valve prolapse is the most common condition of the heart valves, and is present in about 2% of the general population. Surgeons carefully review images from echocardiography and visually assess the valve and surrounding structures before deciding on the technique of repair. The two major surgical options are to fix any abnormal motion of the valve leaflets by resecting tissue and repairing or replacing chords and to reduce the size of the mitral annulus by implanting a ring. Other approaches include (1) repositioning the papillaries for optimal valve cooptation, (2) chordae rupture repair by reattaching the muscle tip via artificial chordae to reestablish correct valve motion, and (3) correcting catheter or guide wire entanglement due to the chordae tendineae.

In order to facilitate this type of procedures, the position of the papillary muscles is identified and presented to the surgeon. Using landmark detection from images, like 4D transesphogeal (TEE) or computed tomography (CT) images, the anterior and posterior papillary muscles may be identified. A major difficulty is that the targeted landmarks are not always visible in all the acquired frames. This makes traditional detection inefficient as there is not enough information to make accurate decisions. Leveraging both temporal data and relative spatial data augments the knowledge available to the detectors. Marginal space learning is combined with random sample consensus (RANSAC) and Markov constraints within different stages of the detection. The result is a robust and efficient landmark detection mechanism that may be clinically deployed to identify the position of the papillary muscle tips in 4D echocardiography acquisitions, thus providing the surgeon quantitative and qualitative evaluation of the sub-valvular system for optimal therapy planning.

In one embodiment, cardiac papillary muscle landmarks are detected. A sub-anatomy bounding box position is estimated based on a mitral valve bounding box. The same procedure may work as soon as two landmarks are spatially related (e.g. left atrial appendage tip and left atrium) rather than two bounding boxes. The box estimation is temporally refined using the RANSAC algorithm. Landmarks are detected in the box using a marginal space learnt classifier. A spatial constraint is applied to the detected landmarks. Temporal refinement of the detected landmarks uses Markov constraints.

The proposed embodiment is tailored to take into account additional information than usually employed in landmark detection. The additional information compensates for signal drop out or structure out of the field of view. By firstly ensuring correct estimation of the entire sub-valvular complex and then further refining the detection of each landmark, accuracy and robustness of the proposed algorithm may be achieved.

In another embodiment, the position of the anterior and posterior papillary landmarks are automatically detected from 4D transesphogeal echocardiography imaging data. A system is statistically trained on an expert annotated image database and takes into account both the anatomy position at a given moment in time, but also the anatomy motion between different temporal samples. Once detected, the system renders the landmarks on the images for measurements purposes. A model of chordae is also rendered using the landmark and the leaflet model.

In another embodiment, a system is provided for automatically tracking the position of the anterior and posterior papillary landmarks from 4D transesphogeal imaging data. The anatomy is automatically detected in a first frame, and subsequent detections are derived from the detection in the first frame. Rendered landmarks and chordae are updated over time to show the dynamics of that anatomical structure.

For tracking in real-time, any detection of any anatomy may be used, such as detecting mitral valve structures. Dynamic organs are modeled in real-time from 4D image data at sufficiently high frame-rate to allow interventional use. To cope with potentially large deformations due to transducer probe motion, a combination of machine-learning based detection algorithm and fast optical flow tracking method is employed.

Mitral valve regurgitation is an important cardiac disorder that affects 1.7% of the US population. An increasing amount of cases are treated percutaneously with a clip, a therapy in which the two mitral leaflets are clipped together to close the regurgitant hole. Due to the complexity of the intervention, image guidance is provided for planning and/or clip deployment. The mitral valve annulus is to be tracked at many (e.g., 18) frames per second for the planning or deployment monitoring. By combining robust machine—learnt classification and image-based tracking, real-time detection is provided. The more robust machine-learnt classification may be used to regularly initialize the image-based tracking. Real-time tracking of valve anatomy may be provided at 10 frames or more a second in 4D medical imaging.

The mitral valve annulus and/or papillary tips in 4D transesophageal echocardiography are used as examples below. Other anatomy and/or types of medical imaging may be used. Any other dynamic anatomy (e.g. other heart valves, left atrial appendage, pulmonaryveins) that may be modeled from dynamic image data (e.g., other ultrasound or 4D CT) may benefit from the real-time detection and/or the detection with spatial and temporal constraints. Through simple parameter adjustments, this embodiment may be adapted to detect any other landmarks that suffer from similar weak representation. In other embodiments, more than one heart valve is identified and parameterized at a same time or during a same imaging session. For example, the mitral valve and the aortic valve are physiologically modeled. The whole heart, half the heart, or other sub-portion of the heart may be modeled.

The mitral valve is small and relatively rapidly moving. As a result, the types of imaging used to view the mitral valve may be limited, such as using ultrasound. Any other dynamic imaging modality, like 4D CT or MRI, may be used. With limited types of imaging, it may be difficult to diagnose or plan from images alone given temporal and/or spatial resolution limitations due to the speed and small size of the mitral valve. In one embodiment, transesophageal echocardiography (TEE) is used to scan cardiovascular morphology for diagnosis, treatment planning and assessment, and surgical guidance. The high quality 4D (volume over time) TEE imaging allows for the analysis of not only the geometry but also the dynamics of the mitral valve.

FIG. 1 shows one embodiment of a method for detecting papillary muscle location in medical imaging. The method of FIG. 1 includes both automatic papillary tip detection with spatial and temporal constraints and real-time tracking. In other embodiments, the automatic detection with spatial and temporal constraints (acts 32 and 34) is provided without the real-time tracking (acts 38 and 40) or vise versa. Additional, different, or fewer acts may be provided. For example, acts 26 and 28 are not provided where anatomy is detected without using bounding boxes. As another example, acts for configuring the ultrasound system of scanning, interacting with rendering, or other workflow for planning or intervention are provided.

FIG. 1 shows a specific example of locating the mitral valve and the papillary muscle or tip. In other embodiments, any valve or the bounding box for any valve is found. Similarly, any sub-valvular structure or landmark bounding box and structure or landmark itself may be detected. For example, this multiple-bounding box approach may operate for detecting point-wise (e.g., single pixel or multiple pixel point like) landmarks. Other types of landmarks may be detected, such as lines, curves, areas, surfaces (e.g., meshes), or volumes.

The acts are performed in the order shown or a different order. For example, acts 24-34 are interleaved with acts 38 and 40. Act 36 is performed in an ongoing manner after act 34 and/or after act 40.

The method is implemented by a medical diagnostic imaging system, a review station, a workstation, a computer, a PACS station, a server, combinations thereof, or other device for image processing medical data. For example, the system or computer readable media shown in FIG. 12 implements the method, but other systems may be used. A processor of any type of system, interacting with memory, user input, display, and/or other components, may perform the acts.

FIG. 2 shows another embodiment of the method for detecting the location of one or more papillary tips. The method of FIG. 2 is similar to the method of FIG. 1, but highlights different aspects of the flow. For the method of FIG. 2, the anatomical landmark is automatically detected using temporal and spatial constraints, but without optical flow tracking. FIG. 3 shows yet another embodiment of the method of FIG. 2, but with additional detail for some of the acts.

Additional, different, or fewer acts may be provided in the embodiments of FIGS. 2 and 3. The acts of FIGS. 2 and 3 may be performed in any order. The same or different device (e.g., processor) discussed above for FIG. 1 may implement FIG. 2 or 3.

The acts of FIGS. 1-3 may be performed in real-time, such as during scanning. The landmark may be detected, redetected at a different time, and/or tracked over time while scanning to acquire subsequent datasets or frames representing the volume. Measurements and/or images of automatically detected anatomy may be provided in fractions of a second, such as 0.05 or fewer seconds, from acquisition of the data representing the volume. Alternatively, the acts are performed as desired by a clinician regardless of whether a patient is currently at the facility or being scanned. The acts may be performed during an appointment or off-line in a review period. The patient-specific data may be associated with previous acquisition rather than in real-time.

A processor may perform the acts automatically. The user causes the patient to be scanned or obtains scan data for the patient from a previous scan. The user may activate the process. Once activated, the anatomy is identified, and images are generated without further user input. User input of locations of the anatomy in any of the scan data may be avoided. Some user input may be provided, such as for changing modeling parameter values, correcting detected locations, altering imaging (e.g., changing a view direction for rendering), and/or to confirm accuracy.

In act 22, a sequence of frames of medical imaging data is acquired. The medical imaging data is TEE data or another type. For TEE data, an ultrasound TEE probe is inserted into the esophagus of the patient and oriented to acoustically scan the heart.

Any scan format may be used. A given scan representing the patient for a given period may use one or multiple transmissions and corresponding receptions of acoustic echoes. The data from a complete scan of the field of view is a frame of data. By repeating the scan of the field of view, different frames representing the heart at different periods are obtained. Any frame rate may be provided, such as ten or more frames a second. By scanning in three dimensions, each of the frames represents a volume of the heart of the patient. In one embodiment, 4D (3D+t) ultrasound data is acquired.

The frames of ultrasound scan data are interpolated to a regular 3D grid, displayed images (e.g., detected and scan converted ultrasound data), beamformed data, detected data, and/or scan converted data. Imaging data may be a frame or data representing a volume. The imaging data may be data from the processing path derived before generating an image or data for a display as an image. A frame or volume of data may be data in an image format or data in a different format (e.g., scan format or representing a three-dimensional grid). The ultrasound data represents a volume or 3D region of a patient.

The volume region includes tissue, fluid, or other anatomy structures. Different structures or types of structures react to the acoustic energy differently. The shape of a structure or spatial aspect may be reflected in B-mode or harmonic data. Flow of fluid may be reflected in color flow, Doppler, spectral Doppler, or Doppler flow data.

The frames of data are acquired in real-time scanning. As the ultrasound data is acquired, the data is provided for detection of the landmark and generation of an image. Alternatively, the data is acquired by transfer or loaded from memory.

The frames of data may be processed the same, such as the same detection applied to each. Alternatively, some frames are used for machine-learnt detection, such as every second, third, fourth, fifth or other period. The sparse sampling of the acquired sequence is used to periodically update the detected location of the landmark. The other frames of data are used for tracking without applying a more time-consuming machine-learnt detection. For the optical flow embodiments, the machine-learnt detection may not be performed sufficiently rapidly for real-time operation at ten or more frames a second but may operate at three or four frames per second. For the other frames, optical flow tracking is performed. The optical flow process may be performed on volume data sufficiently rapidly for real-time operation.

In act 24, one or more candidate anatomical landmarks are located with one or more machine-learnt classifiers. Any machine learning may be used for any detection stages. The machine-learnt classifier is any one or more classifiers. A single class or binary classifier, collection of different classifiers, cascaded classifiers, hierarchal classifier, multi-class classifier, model-based classifier, classifier based on machine learning, or combinations thereof may be used. Multi-class classifiers include CART, K-nearest neighbors, neural network (e.g., multi-layer perceptron), mixture models, or others. A probabilistic boosting tree (PBT) may be used. Error-correcting output code (ECOC) may be used. In one embodiment, marginal space learning is used to train one or more classifiers for detection from medical imaging data.

The classifier is trained from a training data set using a computer. Any number of expert annotated sets of data is used. For example, about 200 volume sequences representing the heart and including one or more valves are annotated. The annotation indicates regions (e.g., bounding boxes), valve landmarks and/or surfaces within the volumes. The different anatomies and/or bounding box of each volume are annotated. This large number of annotations allows use of a probabilistic boosting tree or other machine learning to learn relevant features over a large pool of 3-D Haar, steerable, intensity, and/or other features. Each classifier uses the data sets, features, and/or annotations specific to the anatomy or bounding box being classified.

In one embodiment, the classifier is a knowledge-based probabilistic model, such as marginal space learning using a hierarchical search. A database of known cases is collected for machine learning, providing a database-driven knowledge-based approach. For training data, three-dimensional context information is preserved and guides the detection process. The classifier learns various feature vectors for distinguishing between a desired anatomy and information not being detected. In alternative embodiments, the classifier is manually programmed.

For learning-based approaches, the classifier is taught to distinguish based on features. For example, the probability model algorithm selectively combines features into a strong committee of weak learners based on Haar-like local rectangle filters whose rapid computation is enabled by the use of an integral image. Features that are relevant to the anatomies are extracted and learned in a machine algorithm based on the experts' annotations, resulting in a probabilistic model. Each classifier selects a set of discriminative features that are used to distinguish the positive target from negatives. The features are selected from a large pool of features. The large pool is determined by a programmer or may include features systematically determined.

A classifier may be used to fit a valve model to patient-specific data, providing the locations of various valve structures. By inputting the patient-specific data, the anatomy model is estimated for a given patient. The locations for the anatomy are estimated for a given time, such as end-diastole, and/or for a sequence of times, such as throughout a heart cycle. The anatomy model may include a mesh fit to the valve based on the detected anatomy (see FIG. 7). The model outputs the mesh or the mesh is formed based on the locations of anatomy output by the model. The point-distribution model of the mitral valve surface is mapped according to the landmarks and deformed, within the learned space of shapes, according to boundary detectors estimated through PBT.

Other classifiers are used to detect. The locating of regions (e.g., bounding boxes) and/or landmarks themselves may be performed with one or more machine-learnt classifiers. In one embodiment, a mitral valve region and papillary tips are located with different machine-learnt classifiers. A papillary tip region is found based on an average spatial relationship with the mitral valve region.

The classifier may provide a single candidate location. For small valve structure located using classification on ultrasound volume data, reliably locating a single candidate may not occur. Instead, the classification locates any number of candidates. By locating multiple candidates, other processes (e.g., temporal and/or spatial constraints) may be applied to select the most likely candidate.

The detection of landmark candidates may be direct. The classifier identifies the location of the landmark from the frame of data. Alternatively, the detection of the landmark candidates first locates other information, such as candidates for an overall anatomy structure. In the example of locating the papillary tips, the mitral valve may be located. One or more candidates for the mitral valve are found. Similarly, one or more candidates for a region for the papillary tips near or part of the mitral valve region may be located. The papillary tip candidates are then detected within the papillary region. This hierarchal approach may reduce processing time.

Acts 26-30 provide an example of this multiple region candidates to find multiple other region candidates to then find multiple papillary tip candidates. The same or different number of candidates is found for each stage (e.g., 10 mitral valve regions, 10 papillary tip regions, and 50 papillary tip candidates).

In act 26, a mitral valve bounding box is detected. The bounding box is a rectangular prism or other shape surrounding the anatomy of interest. The bounding box fits to the exterior of the anatomy or includes a margin of any size about the anatomy. The bounding box identifies a region in which the anatomy is likely located, so may be sized to be larger than the expected anatomy. The bounding box is shaped like the typical anatomy, has a shape only generally like the anatomy (e.g., an ellipsoid for the valve), or has a different shape than the anatomy.

Figure 4:
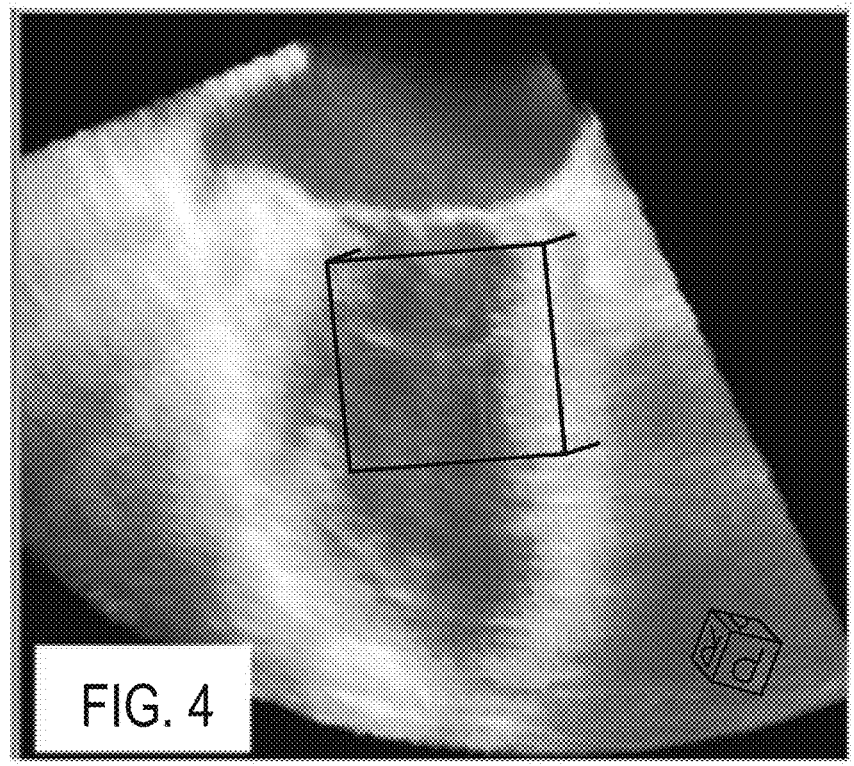
FIG. 4 is an example rendered image showing a detected bounding box as a wire frame.

A marginal space learnt classifier or other machine-learnt classifier detects the location of the bounding box relative to each of multiple frames of data. FIG. 4 shows an example wireframe cube as the bounding box. The bounding box detection includes a position, orientation, and/or scale. In one embodiment, three-dimensional Haar wavelet features and a PBT are used to give high level responses around the mitral valve. The machine-learnt classifier indicates the position of the bounding box given a frame of data. More than one mitral valve bounding box may be detected, such as detecting 5-10 bounding box candidates in each frame of data.

In act 28, a papillary bounding box enclosing the location of the papillary muscle is detected. The papillary bounding box is a same or different size and/or shape as the mitral valve bounding box. The papillary bounding box is positioned, sized, and shaped relative to the mitral valve bounding box to encompass the likely locations for the papillary tips. For example, a rectangular prism adjacent to, separate from, or overlapping with the mitral valve bounding box is detected.

While a machine-trained classifier may be used, the small size of the papillary tips make detection difficult. Instead, the papillary bounding box is detected based on the mitral valve bounding box. The mitral valve is a larger anatomy more likely correctly detected with a machine trained classifier. The bounding box that contains the two papillary muscles is detected in relation to the mitral valve bounding box. The expert-annotated ground-truth boxes provided during training may be used for the detection without machine training. A mean size, orientation, and/or position relative to the mitral valve bounding box is used to position, orient, and/or size the sub-valvular bounding box. By taking all the annotated boxes into account, the detection process ensures that a large anatomical variability is taken into account. Therefore, the papillary bounding box is large enough to ensure various distances between the landmarks and also a large variety of orientations with respect to the mitral valve bounding box.

Where multiple candidates of the valve bounding box are detected, a similar multiple candidates of the sub-valvular bounding box are detected. In other embodiments, more than one sub-valvular bounding box may be detected from each mitral valve bounding box candidate.

Referring to FIGS. 2 and 3, this detection of the papillary bounding box alone does not produce consistent results due to variable relative positions of the valve and the papillary muscles and also because of cardiac motion occurring during a single capture. To provide more consistent results, the estimation of the papillary bounding box is refined in act 29 with a random sample consensus (RANSAC). The candidate papillary bounding boxes from the detection of act 28 are analyzed to discard likely erroneous candidates as false positives. To ensure that the location of the anatomies across the entire volume is consistent, a temporal refinement is employed by running the RANSAC algorithm on all available frames being used for machine-learnt detection. The estimation of papillary bounding box location is enhanced to take into account results of the detector on the neighboring time frames. Outliers are removed and papillary bounding box motion is smoothed from a temporal perspective.

RANSAC is based on finding the best fitting data among a random sample of input variables. The algorithm starts by selecting randomly the minimal (e.g., preconfigured) number of candidates to fit a specific model. The inliers falling under a specific threshold are counted. This process is repeated, until the number of inliers found is large enough or the probability of finding a better model is lower than a specified threshold. Generally the number of iterations N can be obtained as:

$$N = \frac{\log(1-p)}{\log(1-\gamma^s)}$$

where ρ is the probability threshold of the candidates, y is the inlier ratio (the number of inliers divided by the total number of candidates), and s is the number of selected samples.

For instance, the algorithm picks six frames randomly and runs the sub-valvular box detection on them, obtaining six boxes. Then, the box in the current frame is adjusted in order to obtain smooth motion between all candidates. This adjustment is done taking into account both the Euclidian distance between the box centers and the compound axis angle differences, while keeping the distance and angle under a specific threshold for each frame pair. As another example, selection of different candidates is used instead of adjustment. The candidates more likely satisfying the criteria are selected as inliers. Any number of papillary bounding box candidates per frame is output by the refinement of act 29.

As shown in FIG. 3, once the papillary bounding box or boxes are detected for each frame, the volume or frame of data is cropped and given as input to the landmark position detector. The landmark detection is applied only to the data designated by the papillary bounding box. This cropping operation lowers the memory footprint of the following operations and it also lowers the input domain for any operations.

In act 30, candidate locations of the papillary muscle or tips are detected. The detected candidate locations are within the candidate papillary bounding boxes.

Any machine-learnt classification may be used for detecting the papillary muscle. In one embodiment, the first stage of marginal space learning, position detection, produces a number of candidates of position in which the specific landmark is located. The position detectors output a preconfigured number of candidates for the desired landmark. Different or the same classifier may be used for detecting different papillary muscles. For example, the pipeline is split into branches for each papillary muscle, such as the anterior and posterior papillaries. The employed algorithms are the same for both anterior and posterior papillary tips, but the parameters or features and resulting trained classifier are customized for the different anatomy. Any number of papillaries or other landmarks candidates may be detected.

As represented in FIG. 3, the coordinate system is converted. The papillary bounding box may be used to define a coordinate system. The data from the frame representing locations in the bounding box is transformed to the coordinate system. After detection, the coordinate system may be transformed back to the display or scanner coordinate system of the frames of data.

Since the features used for detection may be spatial features, the search range within the bounding box is limited. The search range prediction stage is an incremental step from the volume cropping and aims to leverage the training data provided for the detection pipeline. All the available annotations for the current landmark are loaded and a bounding box is fitted around them. This is done by applying principal component analysis on their three-dimensional coordinate vectors. This search range box along with the cropped volume data are then supplied to a position detector (e.g., first stage of the marginal space learnt classifier).

The machine-learnt classifier is trained to predict candidates based on the intensity of the echo data. Having the domain restricted to a specific zone in the data and within a specific search range enables the classification to function efficiently and produce N candidates out of which the final landmark may be selected. Any number N of candidates may be detected, such as N=60.

Figures 5A, 5B:
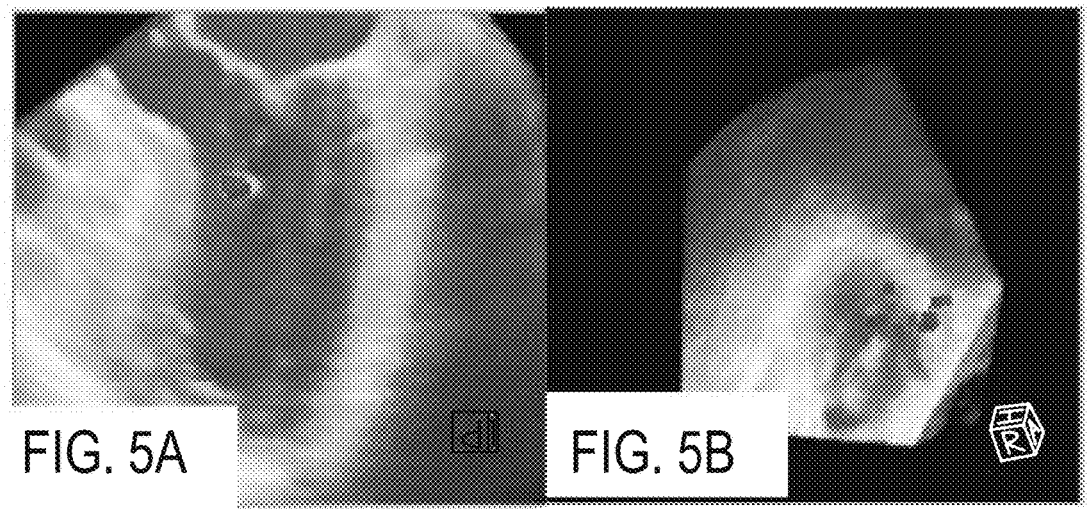
FIGS. 5A and 5B show example rendered images with highlighted locations of candidate points of papillary tips in a tight pattern and a broad pattern, respectively.

To further reduce the number of outliers produced, this element runs a second time on the same domain but using the previously dismissed candidates as negative samples, therefore providing a tighter fit around the targeted landmark. Two opposite examples of the output of this stage in the detection pipeline can be observed in FIGS. 5A and 5B. In FIG. 5A, because the landmark is clearly visible in the echo data, and the boxes as well as the search ranges are correct, the position detector easily places all the output candidates around the papillary tip. In FIG. 5B, due in part to the larger amount of noise in the data and to the nature of the anatomy visualized, a clear position of the papillary muscle cannot be observed. Therefore, the position detector does not output clustered candidates. Unfortunately, each candidate's individual probability is not a good indicator of detection success as some of the candidates may end up on locations with similar image features as the papillaries, like the cardiac wall.

In act 32 of FIGS. 1-3, outlier candidates are removed. The candidate anatomical landmarks detected in act 30 are limited using a spatial constraint. Candidates not satisfying the spatial constraint are removed or not used. If outside a spatial range or bounded region (e.g., distance, area, or region), the candidates are removed. The processor filters out the outliers and chooses the best fitting positions for the landmark.

Any number of spatial criteria may be used. In one embodiment, the distance between the candidates and another landmark is used. For example, a different part of the mitral valve is detected. The papillary tip candidates are limited to be within a given distance from this different part. In another embodiment, the position of the papillary candidates is limited to a bounded area (e.g., range of distances) around another previously detected landmark. This ensures that the papillary landmark candidates are neither too close or too far from another key point of the anatomy. The idea is to find a stable range in which most of the candidates should reside in comparison to other surrounding anatomical elements. This stage is used to do a spatial selection within the same time or for the same frame of data.

In the papillary tips detection example, the anterior and posterior mitral commisures are used as the other anatomy. These landmarks are chosen to discard papillary tip candidates falling on the mitral leaflets. Similarly, if papillary tip candidates are too far from the commissures, the candidates are either on the wrong side of the chamber or have received a high response from the interior of the cardiac wall.

In act 34, one of the candidate locations is selected for each frame. The location of the particular papillary muscle, such as the tip, is selected. One of the candidates remaining after limiting with the spatial constraint is selected for a given representation of the volume of the patient. Where different papillaries are being detected, one of each different papillary is selected for each frame.

The selection uses a temporal constraint. A set of candidates is provided for each time or frame. The selection of one candidate in a frame uses the candidates from other frames. The spatial displacement from frame to frame is limited. The selection relies on avoiding sudden or large changes in displacement over a short time. Candidates are filtered out based on the neighboring frames. For example, a Markov constraint seeks to smooth out the motion of the candidates. To achieve this, the Markov constraint takes the spatially constrained detected points (i.e., candidates) and compares the points with similar results in the previous and/or subsequent one or more frames. Only the candidates that are closer between the two frames are selected. Of course, this assumption is conditioned by the speed at which the anatomy moves and by the temporal resolution of the acquired data. In the case of the papillary muscles, none of these two limitations apply, as the papillary muscles stay relatively in the same area during the cardiac cycle. Therefore, applying this type of constraints solves another issue faced when trying to observe this type of anatomical element: in certain situations the cardiac wall may obscure their location. Considering the temporal stability of the landmark position, the constraint limits the distribution of the detection candidates to the most probable location even if it is not clearly visible.

In one embodiment, a graph of all spatially constrained machine-learnt classifier detected candidates on the frames leading up to the current one is constructed. The shortest path between a first frame and the last or current frame over time through the candidates is selected. The practical result of this procedure is the selection of the candidate in the current frame that is closer to the position of the papillary tip in the previous frames. More precisely, all the candidates that have been detected so far are organized in the form of a graphical model. Let V be the set of vertices and E be the set of edges. x(v) is the random variable associated with graph node v, and $\varphi(x_v)$ is the local potential represented by the candidate's associated probability as outputted by the position detection stage (e.g., the machine-learnt detection indicates a probability of correct detection for each candidate). The pair-wise potential of each edge, $\varphi(x_u, x_v)$, is defined by the Euclidian distance between the candidates at either end of the edge.

Based on these notations, the joint probability distribution of all the variables in the graph is expressed as a pair-wise Markov Random Field:

$$p(X) = \prod_{v \in V} \varphi_v(x_v) \prod_{[u,v] \in E} \varphi_{u,v}(x_u, x_v)$$

To be able to find the best combination of candidates from the above described graph, max-product belief propagation is run on the graph. To achieve this, $m_{u \to v}^{(t)}(x_v)$ is defined as the max-product message from graph node u to graph node v at timestamp t as a function of $x_v$.

$$m_{u \to v}^{(t)}(x_v) = \max_{x_u \in X_u} \left[ \varphi_v(x_v) \varphi_{u,v}(x_u, x_v) \left( \prod_{w \in \Gamma(u) \backslash v} m_{w \to u}^{(t-1)}(x_u) \right) \right]$$

Let $\mu_v(x_v)$ be the max-marginal of $x_v$ defined as:

$$\mu_v(x_v) = \max_{x' | x'_v = x_v} p(x'_1, x'_2, ..., x'_N)$$

This max-marginal may be computed defining the message defined above:

$$\mu_v(x_v) \propto \varphi_v(x_v) \left( \prod_{w \in \Gamma(v)} m_{w \to v}^{(t)}(x_v) \right)$$

Given these max-marginals, backtracking may be used to compute the MAP (maximum a posteriori estimation) estimation such that:

$$\hat{x} \in \operatorname*{argmax}_{x'} p(x'_1, x'_2, ..., x'_N)$$

This Markov constraint is applied to all detected candidates available from the previous nodes in the detection pipeline, providing the desired result or single papillary tip location in each frame. The processor chooses the candidate in the current frame that has the closest Euclidian distance to similar candidates in neighboring frames. Other graph or non-graph based approaches may be used for selection.

Figure 6:
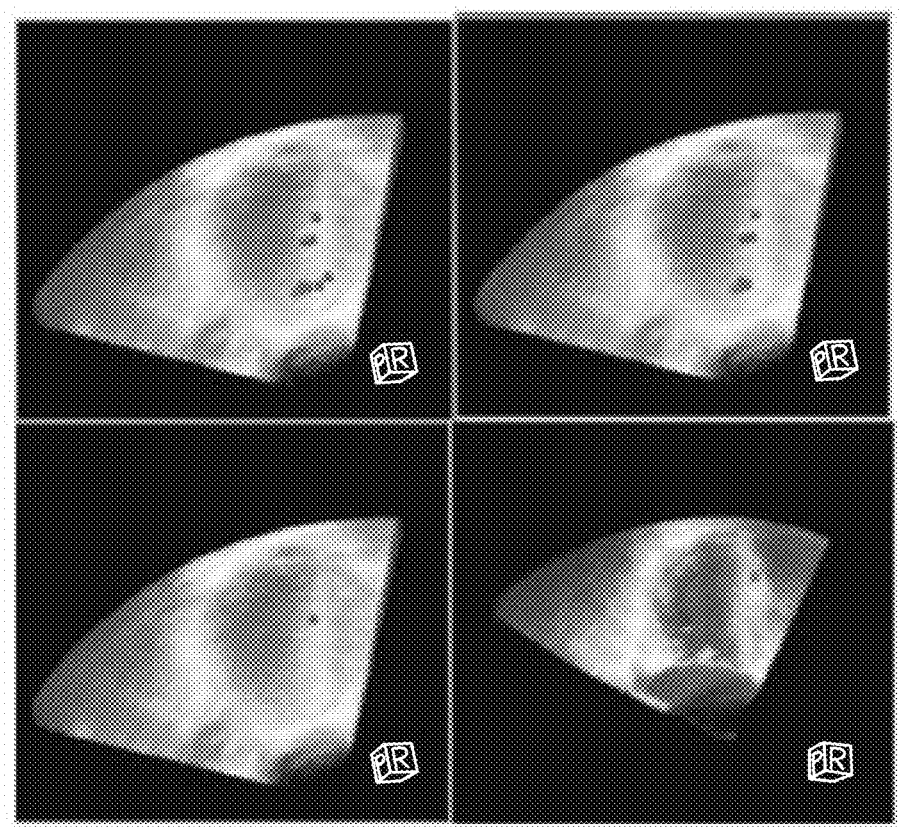
FIG. 6 shows example candidate papillary tip locations output by a detector, remaining after limiting with a spatial constraint, selected using a temporal constraint, and a ground truth papillary tip location.

FIG. 6 shows the combined effects of the spatial and temporal constraints. In the upper left panel, all the candidates output by the position detector are seen. In the upper right panel, a number of candidates that had responses on the lower-left side of the cardiac wall have been excluded using the spatial constraint. Roughly two clusters of candidates are spread out over the boundary between the chamber and the wall remain. By applying the Markov constraint, a correct estimation is made, and this result is presented the lower left panel. The accuracy of the detection and selection is evident when comparing the detected papillary tip location to the expert annotated ground truth papillary anterior tip visible in the lower right panel. The lower right panel shows the ground truth.

In act 36 of FIG. 1, an image of the selected landmark is generated. The image represents the valve, the heart or other region of the patient and is generated from one or more frames of data. A sequence of images may be generated from the frames.

Figure 7:
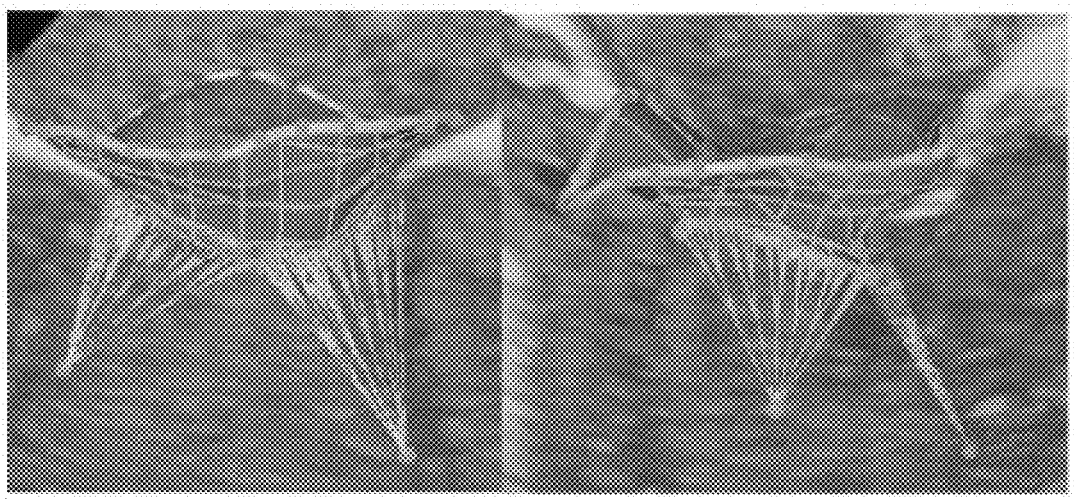
FIG. 7 shows example ultrasound images with respective overlaid graphics of a mitral valve.

The papillary muscle, such as the tip, is highlighted in the image. The highlighting is by adding a graphic, coloring, increasing relative brightness, or otherwise altering a pixel or pixels representing the papillary tip to stand out. In one embodiment shown in FIG. 7, a graphic of a model fit to the mitral valve is added to an ultrasound image of the mitral valve. The graphic of the model includes two enlarged and/or colored points as the detected papillary tips with chordae extending from the tips to the mesh of the valve leaflets. The complete mitral valve model includes the sub-valvular apparatus. In the example of FIG. 7, the frame of data and model are rendered from two different angles with the papillary tips rendered as visual points. In another example, a graphic of the papillary tips is displayed without graphics for other valve structure.

Any imaging may be used. For example, one or more three-dimensional renderings are generated. As another example, a multi-planar reconstruction is provided. A sequence of images may be generated from the sequence of frames. The detected locations in each of the frames are used for highlighting the location of the anatomy.

In one embodiment, the two detected papillary landmarks in a given frame are used in conjunction with a complete model of the mitral valve. This model also includes key anatomical landmarks, such as trigones, commisures, and two surfaces representing the mitral anterior and posterior leaflets. In FIG. 7, the complete model is presented overlaid on a rendering of the ultrasound image from the frame of data. In alternative embodiments, the model with relative position of the detected papillary landmarks is provided without the ultrasound image.

In the visualization of the sub-valvular apparatus, two elements are targeted. First is the representation of the papillary muscle landmarks through points placed at the coordinates obtained from the detection pipeline. Size and color of the points may be selected by the system. The second element is represented by the chordae tendineae, which connect the papillary muscles to the valve free edge. These visualizations give the user a representation of how the whole anatomy interacts. Any chordae placement may be used. For example, from each papillary muscle, six chordae are attached to the free edge, starting from the respective commisures and continuing to each leaflet mid-point. To give a better representation of possible configurations that may be expected on the actual anatomy, each chord has five connection points to the free-edge. Also the chordae have a tendency to branch out towards the free-edges, a characteristic which is simulated by introducing branching points. The first branching point is selected at half of the distance between the papillary muscle and each chord's central connection point. The second branching point is selected at half the distance between the first one and the free edge for each previously obtained branch. From here, a two-way and a three-way split bring the chord to its connection points. Other chordae configurations may be used.

The visualization of the chordae tendineae along with the complete valve complex, including the detected relative position of the papillary tips, gives an added benefit to the whole detection process. A link between various leaflet configurations or pathologies and the papillary muscles may be deduced. The overall model for a patient may indicate which chord may need repair or at least which papillary muscle is connected to that specific region on the free edge.

To evaluate the performance of the method of FIG. 3, a subset of the database of examples used for machine training is extracted to be used as an evaluation test set. This distribution translates into 120 volumes used for training and 30 used for evaluation. Table 1 reports the obtained results. The testing mechanism is based on measuring the Euclidean distance between the annotated landmarks and the ones obtained from the detection pipeline. Also for the sub-valvular apparatus bounding box, the resulting size is also compared. When all the results are gathered, the mean, standard deviation, and median values are computed. Also, outlier information based on 80 and 90% of the highest values, and the overall minimum and maximum values, are noted.

TABLE 1

| Evaluation results | | | | |
| --- | --- | --- | --- | --- |
| | Box Position | Box Scale | Anterior Tip | Posterior Tip |
| Mean | 8.91 | 3.7 | 5.58 | 5.75 |
| Std | 2.09 | 1.21 | 3.46 | 3.02 |
| Median | 8.59 | 3.51 | 4.68 | 5.12 |
| 80% | 10.25 | 4.92 | 9.04 | 6.96 |
| 90% | 12.46 | 5.29 | 12.05 | 9.2 |
| Max | 13.94 | 5.89 | 13.69 | 15.41 |
| Min | 5.19 | 1.32 | 1.87 | 2.03 |

Other techniques may be assessed to further boost the robustness and correctness of the mechanisms proposed. Techniques like Kalman filtering may be employed to improve tracking results. Material properties of the mitral leaflets may be estimated. Due to the usage of mechanical modeling of the forces acting on the anatomies, the chordae tendineae play a vital role, and their distribution is tied to the position of the papillary muscles. By detecting the position of the papillary muscles, the mechanical properties may be better estimated. In preoperative simulations, the position of the muscles may assist in determining the outcome of a procedure.

Referring to FIG. 1, acts 38 and 40 correspond to optical flow tracking. The machine-learning-based detection of acts 24-34 is performed for a sparse sampling of the frames in the sequence during real-time scanning. For example, the papillary tips or other anatomy is detected every fifth frame. Other repetition periods or even irregular sparse sampling of the entire sequence of frames may be used. For these sparse frames, the location of the anatomy is determined. The temporal constraint is applied across the frames of the sparse sampling and not other frames.

Figure 8:
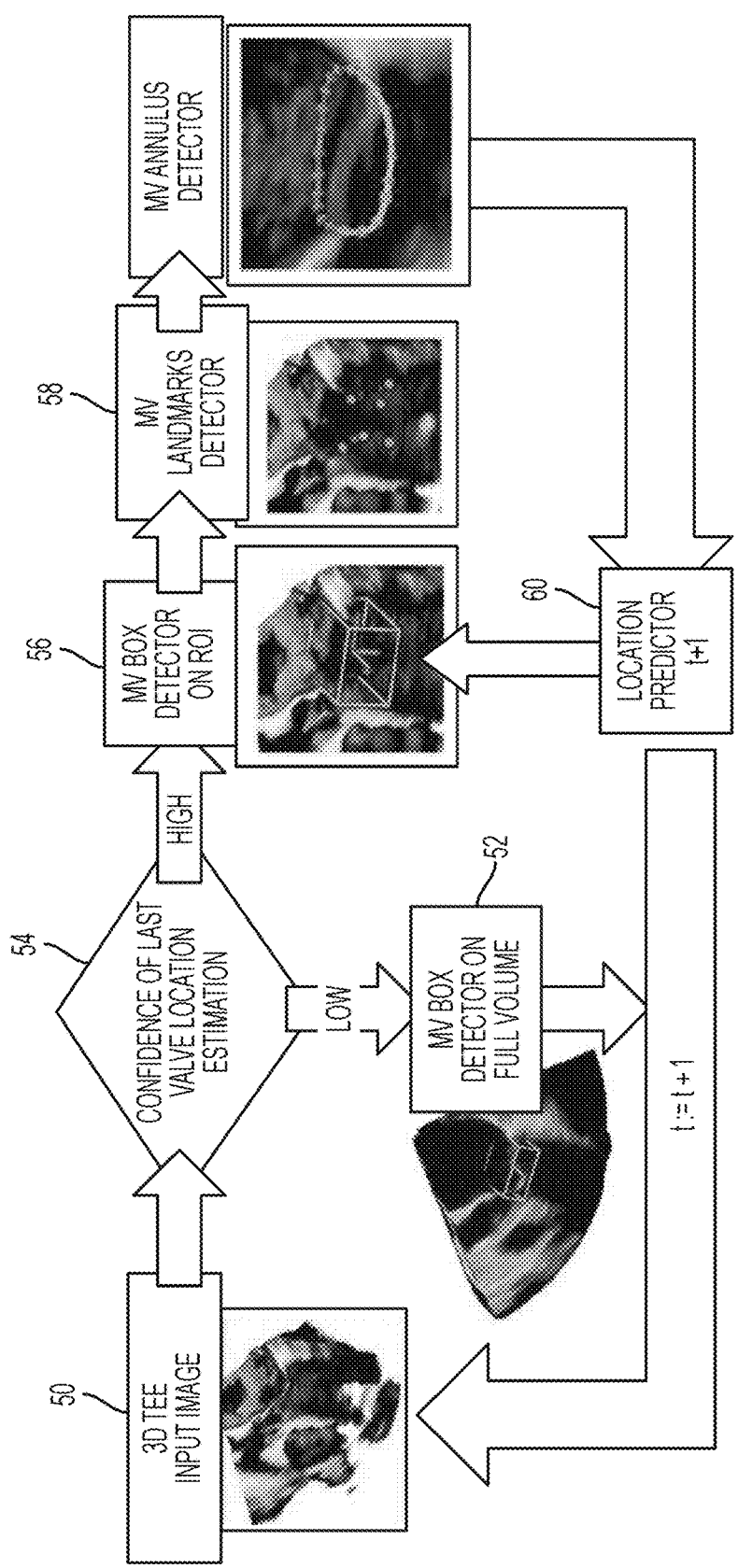
FIGS. 8 and 9 are flow chart diagrams of different embodiments of a method for detecting anatomy with a machine-learnt classifier and tracking the anatomy with optical flow.
Figure 9:
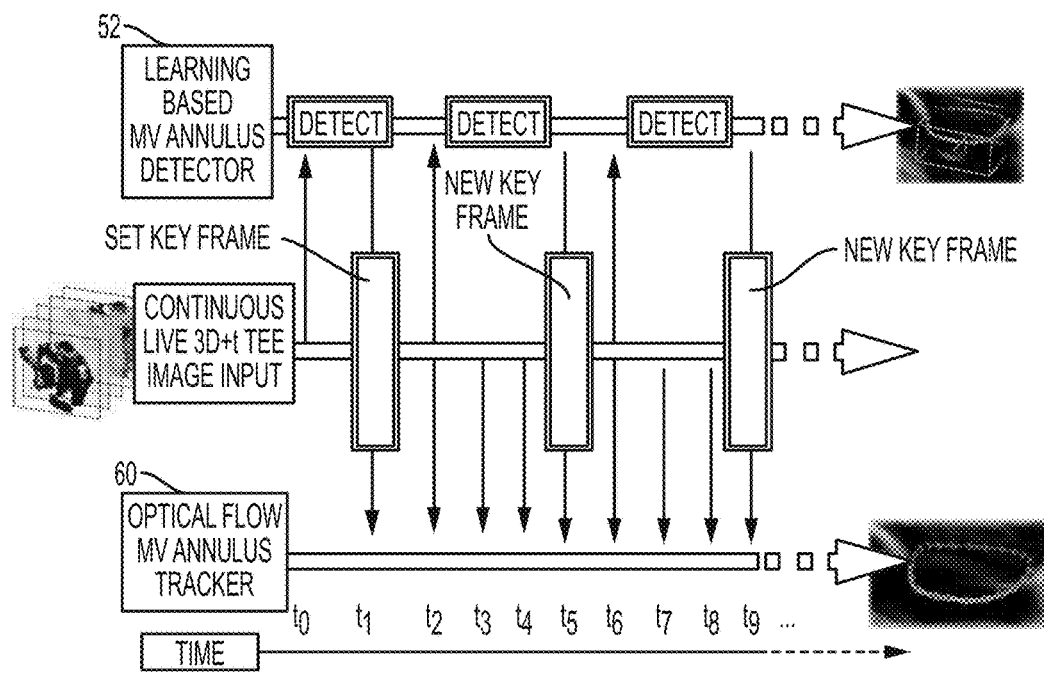

FIGS. 8 and 9 are flow charts of this optical flow tracking in combination with machine-learnt detection. The example anatomy used for optical flow is the mitral annulus, but other anatomy, such as the papillary tips, may use the optical flow tracking.

In act 38 of FIG. 1, the location of the anatomy is determined in other frames using optical flow. Rather than repeating the machine-learnt detection for each frame, the anatomy is tracked in other frames without applying a machine-learnt classifier to the data of the other frames.

Referring to FIGS. 8 and 9, two components 52, 60 (see FIG. 9) of determining the location of anatomy are run in parallel. On system initialization, the detector component 52 starts and determines valve presence in the ultrasound image. If the valve is found, the detector estimates or detects mitral valve annulus curve, which is transferred to the flow tracker component 60 for high frame-rate anatomy tracking. Subsequent mages are being processed in parallel, such that the optical flow tracker processes each new image, while the detector runs in a separate thread to periodically re-detect valve presence and annulus. The re-detected annulus is then re-fed into the tracker to achieve robustness to large motion and ensure continuous control of tracking drift.

In act 52, the location, orientation, and/or scale (box detector) runs on the full volume until at least three consecutive iterations determine high confidence estimates of a location of the mitral valve bounding box. The mitral valve bounding box is used for reducing the computational load. A region of interest (ROI) is positioned around the bounding box and is updated at each iteration of box detection within the ROI to account for probe motion.

In act 54, the location, orientation, and scale are determined for a bounding box in the ROI. By using the ROI, the detection is performed with less than the full volume. The previously detected location is used to define a search region as the ROI. A previously computed organ location may be used to define the ROI in other embodiments. By detecting the bounding box for the value in the ROI, the organ is tracked within the ROI.

In act 56, anatomical components are robustly detected at a fine scale (e.g., detect the mitral valve annulus). The mitral valve annulus detector is composed of a series of learning-based elements, such as for a bounding box, for the mitral valve, and/or for the annulus within the bounding box and/or relative to the mitral valve. The machine-learnt detectors $D_{rigid}$ find the mitral valve presence, location, orientation, and/or size. The same, different, or alternative machine-learnt detects detect the annulus landmarks in act 56 and curve $D_{annulus}$ in act 58. The classifiers or output from the classifiers is used to estimate model parameters $\varphi_{rigid}(t)$ and $\varphi_{annulus}(t)$ for image $I(t)$ by maximizing the posterior probability p modeled by probabilistic boosting tree (PBT) or other classification:

$$\phi(t)=\text{argmax}_\phi p(\phi|I(t))$$

For example, PBT classifiers are trained with Haar-like and steerable features from a manually generated data base of ground truth locations of the mitral valve annulus and landmarks.

In one embodiment of the method of FIG. 8, on system initialization, $D_{rigid}$ is evaluated on the entire volume $I(t_1)$ using efficient search along increasing dimensionality of the parameter space employing the framework of marginal space learning. The search on the complete volume is repeated for subsequent images $I(t_2 \ldots t_n)$ until for at least three consecutive images estimates with high confidence (e.g., $p(\phi_{rigid}(t)) \geq 0.85$) is obtained in act 50. Then, the mitral valve is assumed to be present within the volume and a region of interest (ROI) $\phi_{rigid}(t)$ is computed from the three last estimates to reduce the computational demand for estimating valve location. For subsequent iterations $t > t_n$, $D_{rigid}$ only searches within the ROI until the estimator confidence drops, such as dropping below 0.85 (i.e., $p(\phi_{rigid}(t)) < 0.85$).

To be robust to potential transducer motion, at each iteration, a predictor $P_{rigid}$ estimates the valve location in act 54 for the next algorithm iteration and updates the ROI center by averaging the trajectory over the last six iterations:

$$\phi_{rigid}(t+1)=P_{rigid}(\phi_{rigid})=\Sigma_{t-6}{}^t(\Phi\text{rigid}(t)-\Phi\text{rigid}(t-1)).$$

Following estimation of rigid parameters, $\phi_{rigid}$, $D_{annulus}$ detects anatomically defined landmarks in act 56. For example, the left and right trigone as well as the postero annular midpoint are detected by scanning respective machine-learnt classifiers over search ranges within $\phi_{rigid}$. Finally, the annulus is initialized as a closed curve by fitting a mean annulus shape composed of 58 or other number of points to the previously detected landmarks using the thin plate spline (TPS) transform in act 58. Specially trained PBT classifiers are evaluated by sampling the volume along planes that are transversal to the annulus curve at each curve point. The resulting curve $\phi_{annulus}(t)$ is spatially constrained using a point distribution shape or other model.

Referring to FIG. 1, act 40, and as shown in FIG. 9, the detection of the anatomy location periodically (e.g., $t_1$, $t_5$, $t_9$ ...) is fed to the optical flow tracking of act 60. For example, the papillary muscle location is periodically updated in the optical flow tracking with the location from the machine-learnt detection of act 52 and/or act 58.

In act 60, optical flow tracking is performed. The optical flow tracking has a higher frame rate but may be less robust than the machine-learnt detection. This optical flow tracking is periodically re-initialized by the robust learning-based annulus or other anatomy detector. The learning-based detector of mitral valve location, pose and size and/or other anatomy detection (e.g., landmarks and annulus) is robust to image alterations from transducer motion (e.g., image translation and rotation from probe or patient movement) and artifacts. The optical-flow tracker, which is capable of running at high frame rates, implements a key-frame approach for drift control. While obtaining smooth motion and better preserving temporal consistence across adjacent frames than its complementary detector, the optical flow tracking may drift. Re-initializing or starting with a new reference location from the machine-learnt detection corrects for the drift.

Optical flow tracking is a composite of a sequential tracker $T_{seq}$, which tracks landmarks from $I(t-1)$ to $I(t)$, and a second non-sequential key-frame tracker $T_{key}$, which registers the landmark defined on an initial key frame $I(t_k)$ to the current frame $I(t)$. The estimation results of both trackers are averaged to obtain the final estimate. In this way, the tracker obtains smooth motion via the frame-by-frame component $T_{seq}$ while reducing drift across cardiac cycles via the key frame component $T_{key}$. The tracker estimates higher order terms iteratively by creating a warped image $I^1(t-1)$ out of the template image $I^0(t-1)=I(t-1)$ by applying the previously estimated motion vector field u at locations x, as represented by:

$$I^1(x,t-1)=I^0(x+u^0,t-1)$$

$$M^1 b^1 = b^1$$

$$u^0 = u^0 + u^1$$

with $M^1$ and $b^1$ computed from derivatives over space and time. The scheme is repeated over six or other number of iterations.

In order to achieve high frame rates, the tracker runs directly on the spherical coordinate representation of the ultrasound data (i.e., in acoustic space). Although the error is expected to increase with the distance to the transducer array due to the anisotropic sampling, that limitation does not hinder the application as the mitral valve is typically located 50-70 mm away from the transducer array, where the voxel distance is typically 1.2 mm in the spherical coordinates assuming the typical angular resolution of about 1.3.

As the runtime of detectors D exceed the processing time of the optical flow trackers T, both are run in parallel as shown in FIG. 9. The tracker is reinitialized each time the detector completes processing, by setting the respective annulus detection result $\phi_{annulus}(t_{key})$ and corresponding image $I(t_{key})$ as the key frame for $T_{key}$, while $T_{seq}$ restarts sequential tracking from $t_{key}$ over a buffer of images created while D ran. Following the illustration of FIG. 9, D starts processing at time $t_2$ and completes at time $t_5$. The new key frame is set to $t_{key}=t_2$ and T restarts tracking over images $I(t_2 \ldots t_5)$ that were buffered while D ran to then continue with $t_6$.

Other tracking than optical flow tracking may be used. The detector location information is periodically used to refresh or re-initialize the tracking.

In one embodiment, the detector components are implemented using CUDA version 3.2 and executed on a test machine using a nVidia Quadro K2100M graphics card, an Intel Core i7-4800MQ 2.70 GHz processor and 16 GB of RAM. The testing protocol uses the same mechanisms as the real-time detection pipeline adapted to work on recorded data, which was manually annotated by an expert. In order to evaluate the performance of the system, a testing set is assembled containing recorded TEE data annotated on each individual frame by an expert. The anatomies annotated are the left and right mitral valve trigone landmarks, the postanterior annular midpoint landmark, and the mitral valve annulus. In total, the testing uses 12 TEE volumes, with 153 annotated frames.

To test the method, probe motion is emulated. The data is manipulated with rigid transformations to simulate probe motion based on the degrees of probe freedom that may typically be observed with a TEE transducer (i.e., probe rotation along roll, yaw and pitch angles by up to 45 degrees as well as shifts collinear with the probe shaft). The resulting sequence is therefore a multiple of the original sequence by the factor of 26. The factor is for each image transformation including translation or rotation along roll, pitch or yaw transition into a rotated/translated state, steady state and smooth transition return back to initial position and orientation. Thus, an average of 500 frames covering 30 seconds for volume sequences recorded at 15 volumes per second with a field of view of 90×90×92 mm, covering both valves of the left and right ventricles, is provided.

Figure 10:
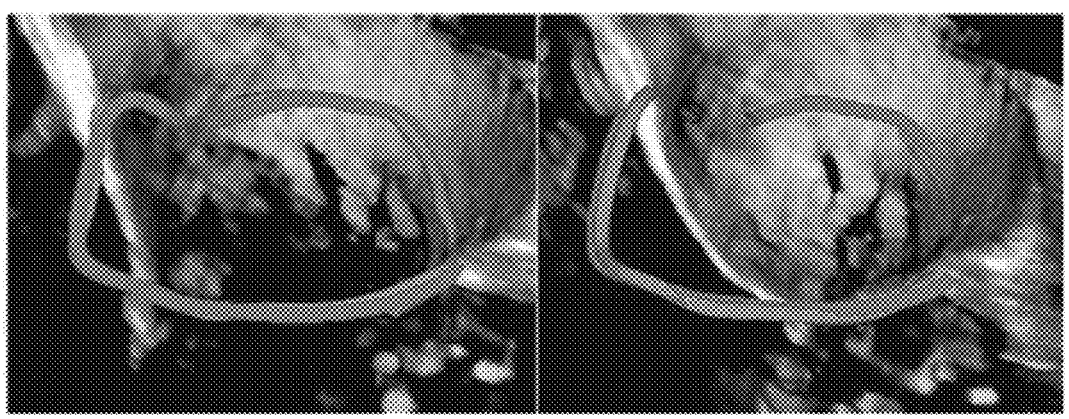
FIG. 10 shows example images of the mitral valve annulus as detected overlaid with the ground truth.

For a quantitative analysis, the algorithmic pipeline is analyzed both as a whole as well as each part separately by looping over the data set described above. For a typical acquisition, the results may be observed in FIG. 10. FIG. 10 shows detection results for the mitral valve annulus with a 1.25 mm error. The table (Table 2) below shows the accuracy of the detector and tracker components independently as well as the complete mechanism in terms of mean error and standard deviation.

TABLE 2

| | Performance evaluation in mm (mean ± standard deviation) | | |
|---|---|---|---|
| Proposed Approach | Detector Only | $T_{seq} + T_{key}$ | $T_{seq}$ only |
| 4.04 ± 1.06 | 3.37 ± 0.69 | 6.57 ± 2.04 | 5.28 ± 1.19 |

For the three landmarks, the error is obtained by simply computing the Euclidian distance between the obtained results and the annotated ground truth. The error for the annular curve is computed by measuring the distance between each point on the detected curve and the closest line segment of the ground truth curve. Table 1 reports the overall accuracy of the proposed approach as well as detector and tracker components independently. The accuracy of the proposed approach ranges within the accuracy of the detector, the tracking components are subject to higher errors, due to drift. While the detector components ran with constant error and followed the probe motion, the trackers were subject to error accumulation over time, particularly in the presence of probe motion.

Moreover, in order to analyze the stability of the tracker components in terms of drift, the tracking error over time or at each frame is measured. FIGS. 11A and 11B show the error for two examples. Using the machine-learnt detector to update the key frame (Policy 2) shows improved accuracy as compared to standard optical flow tracking without the key frame update (Policy 0).

The parallel detection and optical flow tracking may be used in a variety of situations or embodiments. The algorithm may be coupled with the imaging device to enhance the acquisition with higher quality imaging for a sub-volume or different processing than a rest of the scan volume. Planes for multi-planar reconstruction may be computed from the structures that are detected and tracked. Cut planes may be detected and tracked for 3D volume rendering to automatically crop the 3D image to remove surrounding structures and only display the anatomy of interest. Valve assessment or other quantification may be provided in real time by detecting and tracking relevant landmarks (e.g., mitral or aortic annulus diameters may be computed from the structures that are detected and tracked, such that the diameters could be used for optimizing valve function during transcatheter interventions). Any landmark or ensembles of landmarks, representing arbitrary structures. such as organs and medical devices or implants, may be detected or manually placed and tracked for imaging and/or quantification and intraoperative guidance. Anatomy or landmarks may be detected and tracked for real-time visualization as an overlay on other types of images, such as overlaying an organ model or landmarks based on real-time detection on a fluoroscopy image showing a catheter or other device interacting with the organ.

FIG. 12 shows a system for detecting an anatomical landmark. The system includes a transducer 18, an ultrasound scanner 10, and a display 16. The ultrasound scanner 10 includes a processor 12 and a memory 14. In alternative embodiments, the system is a CT scanner, MR scanner, or other imaging system. In yet other embodiments, the system is a workstation, computer, or server for simulating using data acquired by a separate system in real-time or using previously acquired patient-specific data stored in a memory. For example, an ultrasound scanner 10 is provided for acquiring ultrasound data representing a volume, and a separate database, server, workstation, and/or computer is provided for detecting and/or tracking anatomy. Additional, different, or fewer components may be used.

The ultrasound scanner 10 includes a transmit beamformer, receive beamformer, B-mode detector, Doppler detector, harmonic response detector, contrast agent detector, scan converter, filter, combinations thereof, or other now known or later developed medical diagnostic ultrasound system components. As another example, the transducer 18 is not provided, such as where the system is a workstation for off-line or later measurement of valve anatomy.

The ultrasound scanner 10 is configured to scan a heart volume of a patient. The operator selects a cardiac imaging application and/or adjusts various settings to provide the desired frame rate, field of view, modes of imaging, and/or imaging rendering. In response, the scanner 10 provides medical diagnostic ultrasound data representing at least a part of the patient's heart over time. A sequence of frames of data representing a volume of the patient over time is acquired.

The transducer 18 is a piezoelectric or capacitive device operable to convert between acoustic and electrical energy. The transducer 18 is an array of elements, such as a multi-dimensional or two-dimensional array. Alternatively, the transducer 18 is a wobbler for mechanical scanning in one dimension and electrical scanning in another dimension. In another embodiment, the array is a one-dimensional array on a cardiac catheter or a TEE probe. Multi-dimensional arrays or a plurality of one-dimensional arrays may be provided on a TEE probe.

The ultrasound scanner 10 uses the transducer 18 to scan a heart volume of a patient. Electrical and/or mechanical steering allows transmission and reception along different scan lines in the volume. Any scan pattern may be used. For example, a plurality of different planes through the heart is scanned by rotating a TEE array, moving a catheter array, or volume scanning with a matrix array. In one embodiment, the transmit beam is wide enough for reception along a plurality of scan lines. In another embodiment, a plane, collimated or diverging transmit waveform is provided for reception along a plurality, large number (e.g., 16-64 receive beams), or all scan lines.

The scan provides the medical diagnostic ultrasound data representing the heart, part of the heart, or valve volume (e.g., mitral valve) at different times as a sequence. The scan is repeated to provide data for the volume at different times. Ultrasound data representing a volume is provided in response to the scanning. The ultrasound data is beamformed, detected, and/or scan converted. The ultrasound data may be in any format, such as polar coordinate, Cartesian coordinate, a three-dimensional grid, two-dimensional planes in Cartesian coordinate with polar coordinate spacing between planes, or other format. The ultrasound data may be of any type, such as B-mode, flow mode (e.g., PW Doppler), spectral mode (e.g., CW Doppler), Doppler mode, contrast agent, harmonic, or other ultrasound modes of imaging.

The processor 12 is a general processor, digital signal processor, three-dimensional data processor, graphics processing unit, application specific integrated circuit, field programmable gate array, digital circuit, analog circuit, combinations thereof, or other now known or later developed device for detecting and/or tracking anatomy from scan data. The processor 12 is a single device, a plurality of devices, or a network. For more than one device, parallel or sequential division of processing may be used. Different devices making up the processor 12 may perform different functions, such as an automated anatomy detector for detecting and tracking anatomy and a separate graphics processing unit for rendering images of the anatomy. In one embodiment, the processor 12 is a control processor or other processor of a medical diagnostic imaging system, such as a medical diagnostic ultrasound imaging system processor. The processor 12 is configured by or operates pursuant to stored instructions to perform various acts described herein, such as any or all of the acts in FIGS. 1-3 and/or 8-9.

In one embodiment, the processor 12 is configured by software, firmware, and/or hardware to detect anatomy with a machine-trained classifier (e.g., apply input features to a learnt matrix to output a probability of anatomy being at a location). The processor 12 may detect one or a hierarchy of bounding boxes for more efficient detection of the landmarks. Any number of classifiers is applied for any of various landmarks. The processor 12 is configured to apply spatial and/or temporal (e.g., Markov constraint) constraints to select a given landmark for a given frame.

In an additional or alternative embodiment, the processor 12 is configured to determine a location of the anatomical landmark in real-time with the scan. The processor 12 determines the location with machine-learnt classification for a sparse group of the scans and with optical flow for scans intervening in the sparse scans. The processor 12 may periodically reinitialize the optical flow with the locations from the machine-learnt classifier.

The processor 12 may generate an image. The detected landmark or landmarks are used to generate an image. The patient-specific scan data may be used for imaging. The image provides a visualization of the heart or valve that is a function of the detected and/or tracked landmark, such as showing a model positioned relative to a medical image based on the detection or tracking.

The display 16 is a CRT, LCD, plasma, projector, printer, or other output device for showing an image. The display 16 displays an image of the detected anatomy, such as an image of a valve rendered from medical data and overlaid or highlighted based on the estimates of the anatomy position, orientation, and/or scale. The display 16 displays a sequence of renderings to generate a visualization of the anatomy motion through the sequence. The visualization may be generated during a same examination session as the scan, such as in real time with the scanning. The detected anatomy may or may not be segmented, such as just displaying the anatomy.

The memory 14 is a buffer, cache, RAM, removable media, hard drive, magnetic, optical, database, or other now known or later developed memory. The memory 14 is a single device or group of two or more devices. The memory 14 is shown within the system 10, but may be outside or remote from other components of the system 10.

The memory 14 stores the ultrasound data, such as ultrasound data representing a heart or valve volume at different times in a heart cycle. The heart volume includes at least one valve, but other portions of the heart or other anatomy may be represented. The memory 14 stores flow (e.g., velocity, energy or both), spectral, and/or B-mode ultrasound data. Alternatively, the medical image data is transferred to the processor 12 from another device. The medical image ultrasound data is a three-dimensional data set, or a sequence of such sets. The data represents a three-dimensional region. Any format may be used, such as voxels interpolated to a three-dimensional grid or data representing parallel or non-parallel planes.

For real-time imaging, the ultrasound data bypasses the memory 14, is temporarily stored in the memory 14, or is loaded from the memory 14. Real-time imaging may allow delay of a fraction of a second, or even seconds, between acquisition of data and imaging with results of detection and/or tracking. For example, real-time imaging is provided by generating the images substantially simultaneously with the acquisition of the data by scanning. Substantially allows for delay by three or fewer seconds from completion of a scan to use of the scan for an image. While scanning to acquire a next or subsequent set of data, images and measurements are generated for a previous set of data. The imaging occurs during the same imaging session or patient appointment used to acquire the data. The amount of delay between acquisition and imaging for real-time operation may vary, such as a greater delay for initially locating valve anatomies with less delay for tracking. In alternative embodiments, the ultrasound data is stored in the memory 14 from a previous imaging session and used.

The memory 14 is additionally or alternatively a non-transitory computer readable storage medium with processing instructions. The memory 14 stores data representing instructions executable by the programmed processor 12 for detecting anatomical or other landmarks. The instructions for implementing the processes, methods and/or techniques discussed herein are provided on computer-readable storage media or memories, such as a cache, buffer, RAM, removable media, hard drive or other computer readable storage media. Computer readable storage media include various types of volatile and nonvolatile storage media. The functions, acts or tasks illustrated in the figures or described herein are executed in response to one or more sets of instructions stored in or on computer readable storage media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one embodiment, the instructions are stored on a removable media device for reading by local or remote systems. In other embodiments, the instructions are stored in a remote location for transfer through a computer network or over telephone lines. In yet other embodiments, the instructions are stored within a given computer, CPU, GPU, or system.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

We claim:

1. A method for detecting sub-valvular location in medical imaging, the method comprising:
   acquiring a sequence of frames of medical imaging data, each of the fames representing a volume of at least a region of a heart of a patient;
   detecting a valve bounding box enclosing a valve of the heart in each of the frames;
   detecting, in each of the frames, a sub-valvular bounding box enclosing the sub-valvular structure location based on the valve bounding box;
   detecting, in each of the frames, candidate locations of sub-valvular location within the sub-valvular bounding box;
   removing the candidate locations outside a spatial constraint;
   selecting one of the candidate locations remaining after the removing in each of the frames as the sub-valvular location, the selecting being a function of the candidate locations across the frames; and
   highlighting the sub-valvular location in an image of at least the region of the heart of the patient.

2. The method of claim 1 wherein acquiring comprise acquiring transesophageal echocardiography data.

3. The method of claim 1 wherein detecting the valve bounding box comprises detecting a rectangular prism with a marginal space learnt classifier.

4. The method of claim 1 wherein detecting the sub-valvular bounding box comprises detecting a rectangular prism based on an average position of the sub-valvular bounding box with respect to the valve bounding box.

5. The method of claim 1 wherein detecting the valve bounding box comprises detecting a plurality of candidate mitral valve bounding boxes in each frame, and wherein detecting the sub-valvular bounding box comprises detecting a respective plurality of candidate papillary bounding boxes in each frame and selecting the papillary bounding box for each frame as a Random Sample Consensus of the candidate papillary bounding boxes across the frames.

6. The method of claim 1 wherein detecting the candidate locations comprises detecting with a marginal space learnt classifier.

7. The method of claim 1 wherein removing comprises limiting the candidate locations to a bounded region relative to a landmark of the valve the valve comprising a mitral valve.

8. The method of claim 1 wherein selecting comprises selecting with a Markov constraint.

9. The method of claim 1 wherein selecting comprises selecting a set from different sets of the candidate locations with only one of the candidate locations in each frame, the selecting being a function of temporal displacement between the candidate locations within the set.

10. The method of claim 1 wherein highlighting comprises displaying a graphic of a model of a mitral valve including a representation of a papillary muscle location and chordae connecting the papillary muscle location to leaflets of the mitral valve or displaying a graphic of the papillary tips without graphics for other valve structure.

11. The method of claim 1 wherein acquiring comprises selecting a sparse sampling of the sequence of a set of frames representing the heart over time;
   further comprising locating the sub-valvular location in the frames not in the sparse sampling using optical flow.

12. The method of claim 11 further comprising periodically updating the sub-valvular location for the optical flow with the selected sub-valvular location.

* * * * *